July 19, 1932.    R. S. BLAIR    1,868,087
WAVE MOTOR
Filed Aug. 8, 1922    2 Sheets-Sheet 1
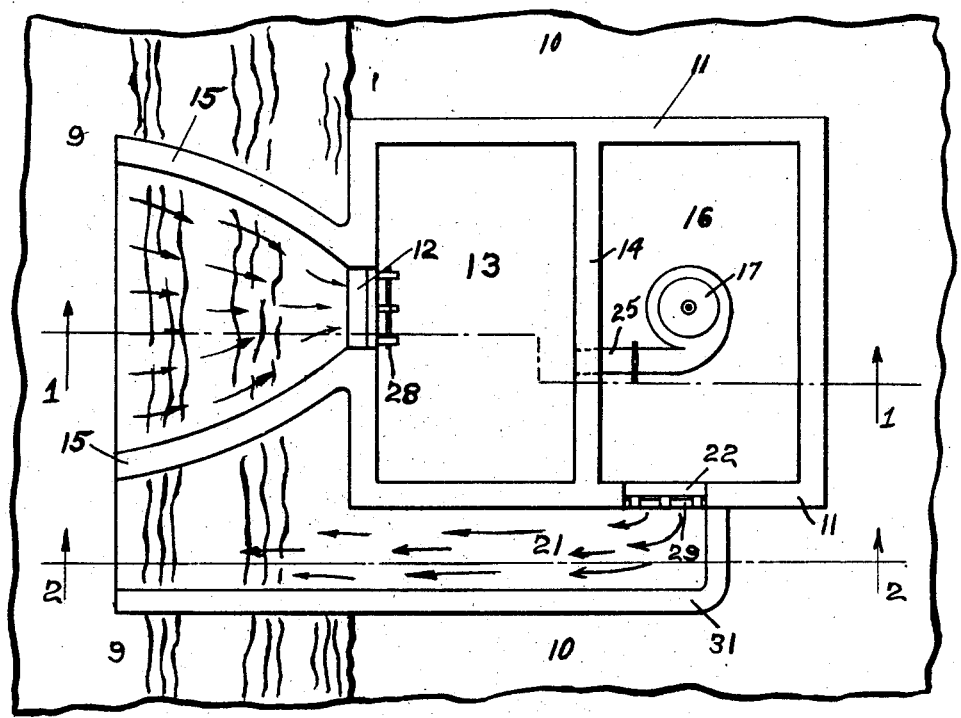
Fig. I
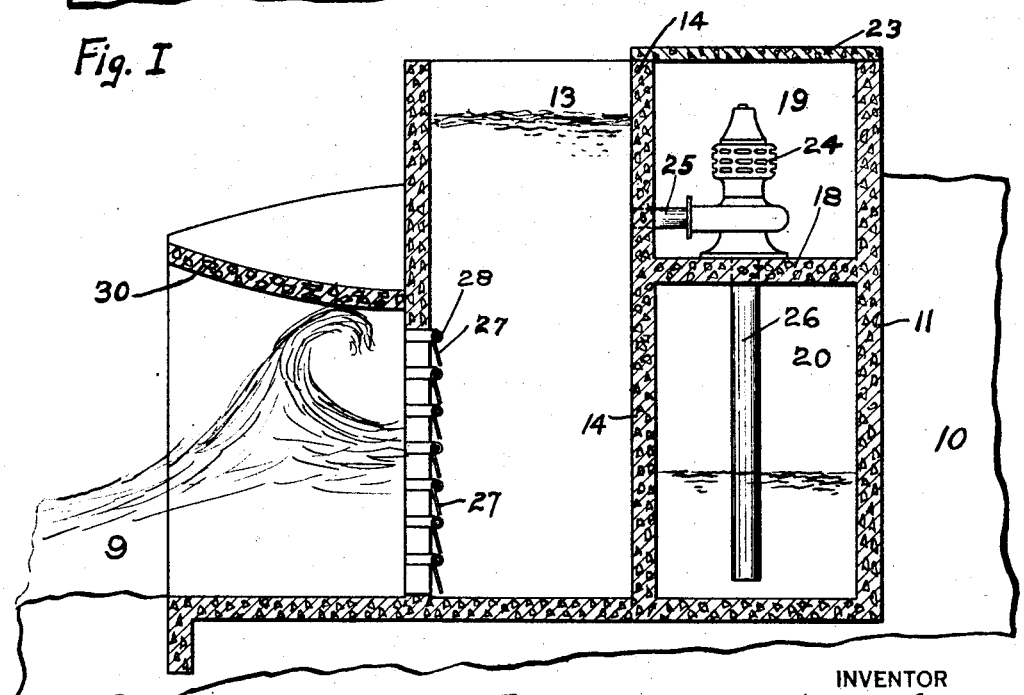
Fig. II
INVENTOR
Robert S. Blair July 19, 1932.  R. S. BLAIR  1,868,087
WAVE MOTOR
Filed Aug. 8, 1922   2 Sheets-Sheet 2
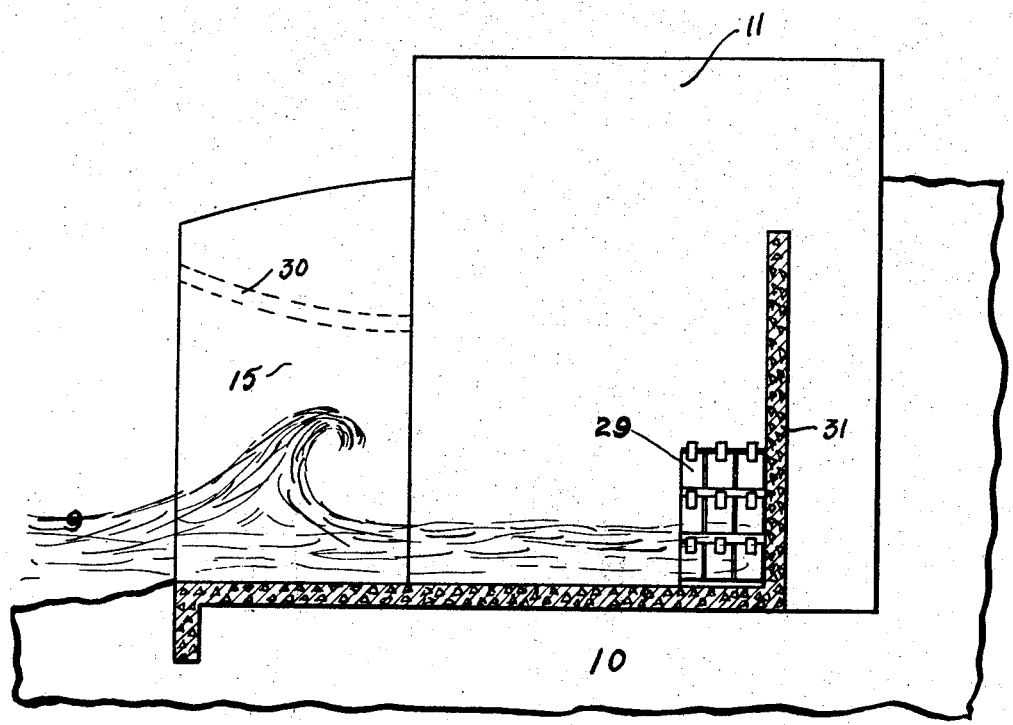
Fig. III
INVENTOR
Robert S. Blair Patented July 19, 1932

1,868,087

UNITED STATES PATENT OFFICE

ROBERT S. BLAIR, OF STAMFORD, CONNECTICUT

WAVE MOTOR

Application filed August 8, 1922. Serial No. 580,398.

This invention refers to wave motors and more particularly to apparatus of such form adapted to convert the energy contained in ocean waves into a more useful form.

One of the objects thereof is to provide a wave motor of simple and practical construction and efficient in operation. Another object is to provide a mechanism capable of converting a high percentage of the energy contained in ocean waves into a useful form available for utilitarian purposes. Another object is to provide an apparatus of the above nature durable in construction and capable of withstanding the impact of ocean waves for an indefinite period. Another object is to provide a wave motor capable of absorbing the wave energy of ocean waves under all conditions of tide heights. Other objects will be in part obvious and in part pointed out hereinafter.

The invention accordingly consists in the features of construction, combinations of elements and arrangement of parts which will be exemplified in the structure hereinafter described and the scope of the application of which will be indicated in the following claims.

In the accompanying drawings in which is shown one of the various possible embodiments of this invention, Figure I is a plan view of a form of wave motor including a portion of the ocean shore upon which the apparatus is erected;

Figure II is a side elevation in cross section of the wave motor shown in Figure I, the section being taken along the line 1—1 in the direction as indicated by the arrows, certain parts being included which are omitted in Fig. 1; and Figure III is a side elevation of the wave motor shown in Figure I in cross section, the section being taken along the line 2—2 in the direction as indicated by the arrows, certain parts being included which are omitted in Fig. 1.

Similar reference characters refer to similar parts throughout in the several views of the drawings.

Turning now to the accompanying drawings, in Figure 1 there is shown a portion of the ocean 9 with a section of an ocean shore 10 upon which is erected a concrete structure 11 which serves as a power house and also as a part of the wave motor. The ocean side of the concrete structure 11 has formed integral therewith a pair of vertical walls 15 which diverge from each other as they extend away therefrom and between them at their point of connection with the side wall of the concrete structure 11 there is a sluiceway 12 which opens into the stand pipe 13 which is formed by the wall 14 which divides the interior of the concrete structure 11 into two compartments. The remaining part of the interior of the concrete structure 11 is divided up by a floor 18, as shown in Figure II, into two parts, the upper compartment 19 and a well or receiving space 20 which is connected with the raceway 21 by the opening 22. The upper compartment 19 which is roofed over with a concrete slab 23 has mounted on the floor 18 a turbine driven electric generator 24 which has its water intake connected by a pipe 25 to the stand pipe 13 and its discharge is connected to a draught tube 26 which extends downward nearly to the bottom of the well 20 and is shaped at its lower end to obtain the greatest efficiency in the operation of the turbine-driven generator 24.

The sluiceway 12 is provided with a plurality of gates 27 which are swiveled at their upper ends on a series of parallel rods such as 28; the gates 27 are arranged in a series of parallel horizontal rows and are arranged to permit water to flow inward into the stand pipe 13 only closing whenever there is a tendency for the flow of water to reverse. The opening 22 is closed by a similar series of gates 29 which are also supported at their upper ends and are arranged to permit the flow of water from the well 20 out through the opening 22 into the raceway 21 and to close whenever there is a tendency toward a reversal of flow of the water.

In Figure II there is shown a concrete slab 30 bridging the space between the two diverging walls 15 and which slopes downward as it approaches the front end of the concrete structure 11 until when it unites therewith its lower surface is nearly in line with the upper edge of the sluiceway 12. Turning now to Figure 1, there is shown a concrete wall 31 arranged to divert the outcoming stream of water through the opening 22 and the gates 29 back towards the ocean 9.

The action of the wave motor above described is substantially as follows: Turning now to Figure I and II, as a wave such as is shown in Figure II approaches the shore 10 and reaches the opening between the diverging walls 15 its velocity towards the shore as it enters between the converging walls 15 will increase, as it advances toward the sluiceway 12. Its length diminishes and as the volume of the water in motion and contained in the wave remains constant the velocity of the wave towards the sluiceway 12 must increase; any tendency of the wave to increase its elevation beyond a useful height is retarded by the concrete slab 30 which further tends to increase the shoreward velocity of the wave. The wave finally reaches the sluiceway 12 and battering against the gates 27 causes them to swing open revolving about the rods 28 as axes, and gates 27 remain open as long as the water tends to flow inward therethrough into the stand pipe 13 raising the level of the water contained therein. Where a given velocity and height of waves strike against the gates 27 there will be a certain average height of water maintained in the stand pipe 13 at all times. The water level in the stand pipe 13 will remain at this average height as long as there is a continual movement of waves towards the sluiceway 12 and provided that an excessive amount of water is not drawn by the turbine driven electric generator 24.

The pipe 25 connecting the intake of the turbine driven electric generator 24 passes through the wall 14 at such a place that when the ocean 9 is at its lowest the water level maintained in the stand pipe 13 will be well above it. The water level in the stand pipe 13 thus being at all times above the opening of the pipe 25 there will be a constant flow therethrough into the turbine driven electric generator 24 and therefrom down to the draught tube 26 into the well 20 and therefrom in turn through the opening 22 out through the gates 29 into the raceway 21 and finally flowing into the ocean 9. The level of the water in the well 20 will be maintained at an average height which will be below the level of the water in the ocean 9 at any given amount due to the action of the gates 29 which permit the water in the well 20 to flow out therethrough into the raceway 21 whenever the level in the raceway 21 has been lowered by the return flow of the water contained therein immediately following the impact of a wave against the end thereof. This backward flow of the water following the impact of an ocean wave on the beach can be readily observed by watching the dashing of the waves on any seashore.

From the above arrangement of the apparatus it will be observed that there will be for any given velocity and height of wave a constant head of water operating on the turbine driven electric generator 24 as will be readily seen, so that when the height of the water in the stand-pipe 13 diminishes as the water in the ocean 9 falls at the approach of low tide the water level in the well 20 drops to a corresponding degree. The wave motor shown is so constructed on the shore 10 that no matter how far the tide falls there will always be a series of waves dashing into the space between the two diverging walls 15; and, as a converse of the above condition, even at the highest tides the waves will still have free access to the space included between the diverging walls 15 and the concrete slab 30.

It may be here noted that the term standpipe as used herein is to be interpreted broadly to include any suitable reservoir or container adapted to hold a head of water.

As various possible embodiments might be made of the above invention and as various changes might be made in the embodiment above set forth, it is to be understood that all matter herein set forth or shown in the accompanying drawings is to be interpreted as illustrative and not in a limiting sense.

I claim as my invention:

1. In apparatus of the general nature of that herein described, in combination, a reservoir positioned adjacent a body of water, a plurality of check valves exposed to waves upon said water and leading from said waves into said reservoir, a power utilizing device, means leading water from said reservoir through said power utilizing device and discharging at a point substantially below smooth water level in said body and adapted thereby to utilize the hydraulic head from the surface of the water in said reservoir to a point substantially below said smooth water level, and an outwardly opening check valve through which said discharged water passes and positioned substantially below said smooth water level.

2. In apparatus of the general nature of that herein described, in combination, a reservoir positioned adjacent a body of water, a plurality of check valves exposed to waves upon said water and leading from said waves into said reservoir, a power utilizing device, means leading water from said reservoir through said power utilizing device and discharging at a point substantially below smooth water level in said body and adapted thereby to utilize the hydraulic head from the surface of the water in said reservoir to a point substantially below said smooth water level, and an outwardly opening check valve through which said discharged water passes and positioned substantially below said smooth water level, said first check valves being arranged and adapted to coact with waves at all tide levels of said body of water and said discharge check valve being positioned substantially at or below low tide level.

3. In apparatus of the general nature of that herein described, in combination, a reservoir positioned adjacent a body of water, check valves exposed to waves upon said body of water and adapted to permit the passage of water from said waves into said reservoir, a power utilizing device, means forming a receiving space, means conducting water from said reservoir through said power utilizing device and discharging into said receiving space, and an outwardly opening check valve from said receiving space having an average discharge capacity greater than the average discharge from said water conducting means whereby an air space is maintained over said discharged water and the discharge from said conducting means permitted to continue for a substantial time with said last check valve closed.

4. In apparatus of the general nature of that herein described, in combination, a reservoir positioned adjacent a body of water, check valves exposed to waves upon said body of water and adapted to permit the passage of water from said waves into said reservoir, a power utilizing device, means forming a receiving space, means conducting water from said reservoir through said power utilizing device and discharging into said receiving space, and an outwardly opening check valve from said receiving space having an average discharge capacity greater than the average discharge from said water conducting means whereby an air space is maintained over said discharged water and the discharge from said conducting means permitted to continue for a substantial time with said last check valve closed, said first check valves being arranged and adapted to coact with waves at all tide levels of said body of water and said last check valve being positioned substantially at or below low tide level.

5. In apparatus of the general nature of that herein described, in combination, a reservoir positioned adjacent a body of water, check valves exposed to waves upon said body of water and adapted to permit the passage of water from said waves into said reservoir, a power utilizing device, means forming a receiving space, means conducting water from said reservoir through said power utilizing device and discharging into said receiving space at a point substantially below smooth water level in said body and adapted thereby to utilize the hydraulic head from the surface of the water in said reservoir to a point below said smooth water level, a discharge check valve from said receiving space positioned substantially below said smooth water level and having an average discharge capacity greater than the average discharge from said water conducting means whereby an air space is maintained over said discharged water and the discharge from said conducting means permitted to continue for a substantial time with said last check valve closed.

6. In apparatus of the general nature of that herein described, in combination, a reservoir positioned adjacent a body of water, check valves exposed to waves upon said body of water and adapted to permit the passage of water from said waves into said reservoir, a power utilizing device, means forming a receiving space, means conducting water from said reservoir through said power utilizing device and discharging into said receiving space at a point substantially below smooth water level in said body and adapted thereby to utilize the hydraulic head from the surface of the water in said reservoir to a point below said smooth water level, a discharge check valve from said receiving space positioned substantially below said smooth water level and having an average discharge capacity greater than the average discharge from said water conducting means whereby an air space is maintained over said discharged water and the discharge from said conducting means permitted to continue for a substantial time with said last check valve closed, said inlet check valves being arranged and adapted to coact with waves at all tide levels and said discharge check valve being positioned substantially at or below low tide level.

In testimony whereof I have signed my name to this specification this 5th day of August, 1922.

ROBERT S. BLAIR.